United States Patent [19]
Mukai

[11] Patent Number: 5,893,353
[45] Date of Patent: Apr. 13, 1999

[54] EVAPORATIVE FUEL CONTROLLER FOR INTERNAL COMBUSTION ENGINE

[75] Inventor: Takeshi Mukai, Shizuoka-ken, Japan

[73] Assignee: Suzuki Motor Corporation, Hamamatsu, Japan

[21] Appl. No.: 08/986,131

[22] Filed: Dec. 5, 1997

[30] Foreign Application Priority Data

Dec. 27, 1996 [JP] Japan .................................. 8-357793

[51] Int. Cl.$^6$ .................................................. F02M 33/04
[52] U.S. Cl. .................................................. 123/520
[58] Field of Search .................... 123/516, 518, 123/519, 520

[56] References Cited

U.S. PATENT DOCUMENTS

| | | | |
|---|---|---|---|
| 5,195,495 | 3/1993 | Kitamoto et al. | 123/520 |
| 5,216,998 | 6/1993 | Hosoda et al. | 123/520 |
| 5,269,279 | 12/1993 | Mukai et al. | 123/520 |
| 5,273,018 | 12/1993 | Suzuki | 123/520 |
| 5,297,527 | 3/1994 | Suzuki et al. | 123/520 |
| 5,297,528 | 3/1994 | Mukai | 123/520 |
| 5,335,638 | 8/1994 | Mukai | 123/520 |
| 5,375,579 | 12/1994 | Mukai | 123/520 |
| 5,435,287 | 7/1995 | Mukai | 123/520 |
| 5,441,031 | 8/1995 | Kiyomiya et al. | 123/518 |
| 5,460,143 | 10/1995 | Narita | 123/520 |
| 5,524,595 | 6/1996 | Ito | 123/520 |
| 5,546,913 | 8/1996 | Aoki | 123/520 |

FOREIGN PATENT DOCUMENTS

| | | |
|---|---|---|
| 5-321774 | 12/1993 | Japan . |
| 6-117336 | 4/1994 | Japan . |

*Primary Examiner*—Thomas N. Moulis
*Attorney, Agent, or Firm*—Flynn, Thiel, Boutell & Tanis, P.C.

[57] ABSTRACT

An evaporative fuel controller for an internal combustion engine, which is designed to prevent the engine from experiencing aggravated drivability and rough idle operation with a concomitant stall, which would otherwise occur when a fuel tank is refueled during operation of the engine. The evaporative fuel controller includes a control which, when it detects that the engine is in idle operation and that the fuel tank is being supplied with fuel, then a mode of control over a purge valve is changed from one which accommodates an operating state of the engine to another which permits the continuance of engine idle operation as well as the continuance of the supply of fuel to the tank.

4 Claims, 3 Drawing Sheets

5,893,353

EVAPORATIVE FUEL CONTROLLER FOR INTERNAL COMBUSTION ENGINE

FIELD OF THE INVENTION

This invention relates to an evaporative fuel controller for an internal combustion engine. More particularly, it relates to an improved evaporative fuel controller for an internal combustion engine which is adapted to prevent the engine from experiencing impaired drivability and rough idle operation with a concomitant stall, which would otherwise occur when a fuel tank is supplied with fuel during operation of the engine.

BACKGROUND OF THE INVENTION

In vehicles, evaporative fuel which leaks into the ambient air from a fuel tank, etc., is described as one of causes of air pollution because of the large content of hydrocarbons (HC). The evaporating fuel also contributes to fuel loss. Accordingly, various techniques are known as a prevention thereagainst, and there is an evaporative fuel controller representative of one such technique. More specifically, in this controller, evaporated fuel from the fuel tank is absorbed by a canister which contains an absorbent such as activated carbon. When an engine is run, then the absorbed fuel is released from the canister so as to be supplied to the intake system of the engine.

Examples of the above-described controller are disclosed in published Japanese Patent Application Laid-Open Nos. 5-321774 and 6-117336, as detailed below.

One evaporative fuel controller as disclosed in the 5-321774 publication provides a purge control method in which, when evaporative fuel absorbed by the canister is purged into the intake system of an engine on the basis of a purge duty ratio during engine idle operation, then a weight loss correction factor for correcting a quantity of fuel in accordance with a purging amount of evaporated fuel is set to execute addition and subtraction between the correction factor and a predetermined value, thereby controlling an air-fuel ratio so as to purge the evaporated fuel; and, the purge control method is characterized by the steps of: setting two different predetermined values as the predetermined value; determining a concentration of evaporated fuel during purging thereof; and, shifting the aforesaid predetermined values from one to another, depending upon a higher or lower level of the determined concentration, thereby executing addition and subtraction between the correction factor and the predetermined value.

Another evaporative fuel controller as disclosed in the 6-117336 publication includes a control means for inhibiting the supply of evaporated fuel to the intake system of the engine when the control means detects that the engine is in idle operation.

In the prior art evaporative fuel controllers, when the fuel tank is supplied with fuel during operation of the internal combustion engine, a large amount of fuel vapor, which is generated in the fuel tank, is discharged together with air into the ambient air through the canister. At the same time, the evaporative fuel controller is controlling a purge valve because the engine is running. Thus, evaporated fuel is supplied from the canister to the intake system. This means that the controller supplies a high concentration of evaporated fuel to the intake system when the fuel tank is supplied with fuel during operation of the engine. This causes problems in that the engine operates poorly and further undergoes rough idle operation, with a consequential stall.

SUMMARY OF THE INVENTION

In order to obviate the above-mentioned problems, the present invention provides an evaporative fuel controller for an internal combustion engine. It has an evaporation passage communicated (connected) at one end to a fuel tank and at the other end to a canister. A purge passage is communicated at one end to the canister and at the other to the intake system of the engine. A purge valve is located substantially midway along the purge passage, in which the purge valve is controlled in accordance with a running state of the engine. This regulates the amount of evaporated fuel to be fed into the intake system. A control means detects that the engine is in idle operation, and that the fuel tank is being supplied with fuel. Then a mode of control over the purge valve is changed from one which defines an operating state of the engine to another which permits the continuance of engine idle operation as well as the continuance of the supply of fuel to the tank.

The control means detects that the engine is in idle operation when an elapsed time after start-up of the engine is equal to or greater than a predetermined time, and further when vehicle velocity is equal to or less than a predetermined vehicle velocity. The control means detects that the fuel tank is being supplied with fuel when a time-based variation rate of a fuel level in the fuel tank is equal to or greater than a predetermined value, and further when duration for the time-based variation rate as defined by the above is equal to or greater than a predetermined time.

The control means detects that the engine is in idle operation when an elapsed time after start-up of the engine is equal to or greater than a predetermined time, and further when vehicle velocity is equal to or less than a predetermined vehicle velocity. The control means detects that the fuel tank is being supplied with fuel when a time-based variation rate of an internal tank pressure of the fuel tank is equal to or greater than a predetermined value.

The control means detects that the engine is in idle operation when an elapsed time after start-up of the engine is equal to or greater than a predetermined time, and further when vehicle velocity is equal to or less than a predetermined vehicle velocity. The control means detects that the fuel tank is being supplied with the fuel when a time-based variation rate of a concentration of evaporated fuel to be fed into the intake system is equal to or greater than a predetermined value.

In the evaporative fuel controller of the present invention, when the control means detects that the engine is in idle operation, and that the fuel tank is being supplied with fuel, then the control means changes a mode of control over the purge valve from one dependent upon an operating state of the engine to another responsive to the continuance of engine idle operation as well as that of the feeding of fuel into the tank.

The control means detects that the engine is in idle operation, e.g., when an elapsed time after start-up of the engine is equal to or greater than a predetermined time, and further when a vehicle velocity is equal to or less than a predetermined vehicle velocity. The control means detects that fuel is being fed into the fuel tank when a time-based variation rate of fuel level in the fuel tank is equal to or greater than a predetermined value, and further when duration for the time-based variation rate as defined by the above is equal to or greater than a predetermined time.

In addition, the control means detects that the engine is in idle operation when an elapsed time after start-up of the engine is equal to or greater than a predetermined time, and further when vehicle velocity is equal to or less than a predetermined vehicle velocity. The control means detects that fuel is being fed into the fuel tank when a time-based variation rate of an internal tank pressure of the fuel tank is equal to or greater than a predetermined value.

Alternatively, the control means detects that the engine is in idle operation when an elapsed time after start-up of the engine is equal to or greater than a predetermined time, and further when vehicle velocity is equal to or less than a predetermined vehicle velocity. The control means detects that fuel is being fed into the fuel tank when a time-based variation rate of a concentration of evaporated fuel to be supplied to the intake system is equal to or greater than a predetermined value.

Thus, in the evaporative fuel controller, when it is detected that the engine is in idle operation, and that the fuel tank is being supplied with fuel, then a control mode of the purge valve is changed from the usual one adapted for an operating state of the engine to a different one suited for the continuance of engine idle operation as well as the continuance of the supply of fuel to the fuel tank. The purge valve is then powered off for shut-off. Alternatively, the amount of opening of the purge valve is controlled. As a result, the evaporative fuel controller provides a reduced quantity of evaporated fuel to the intake system without allowing a higher concentration of evaporated fuel to be fed in large amounts into the intake system.

DETAILED DESCRIPTION

An embodiment of the present invention will now be described with reference to FIGS. 1 to 3.

Figure 2:
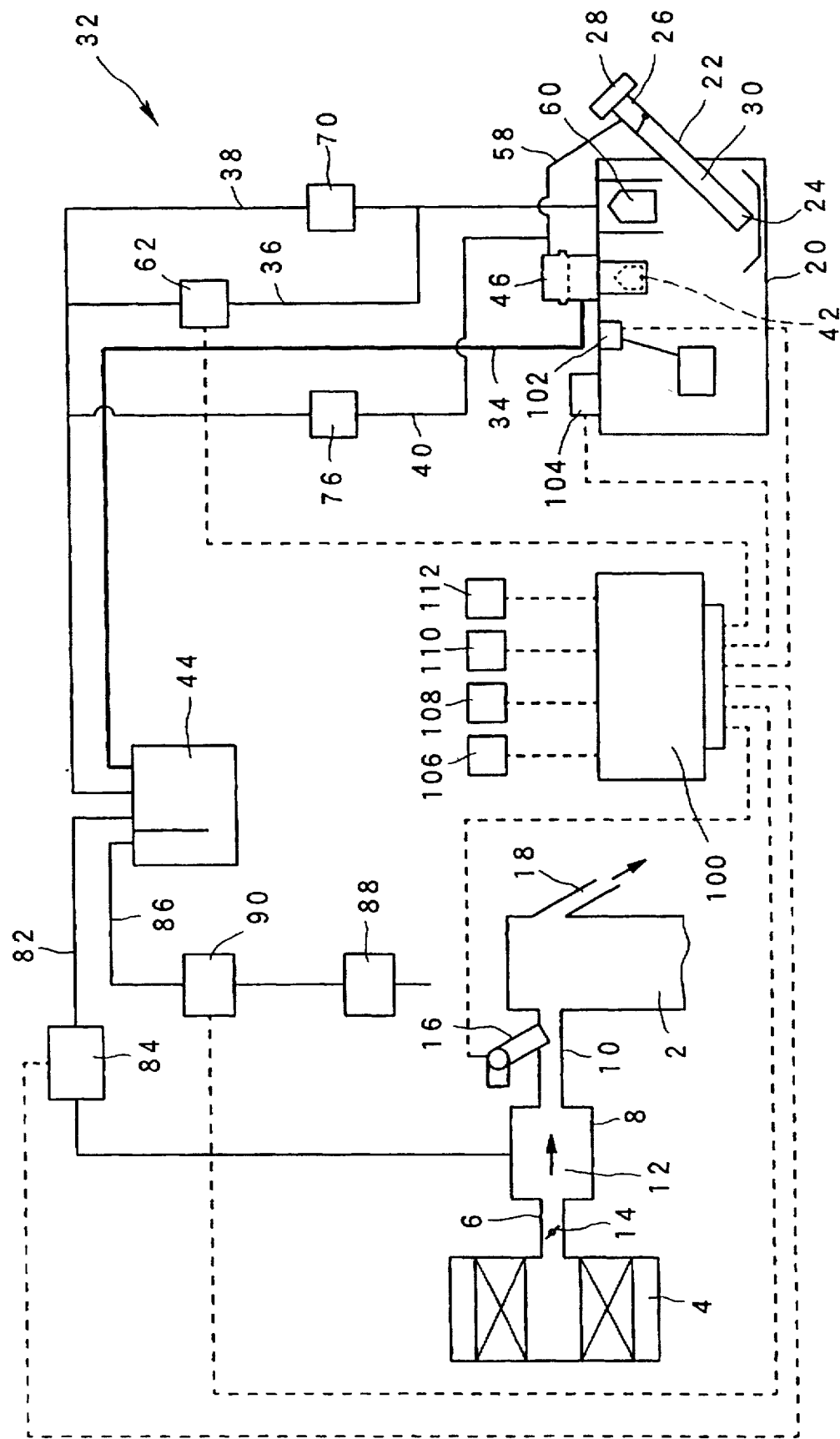
FIG. 2 is a structural view illustrating a system of the evaporative fuel controller; and, FIG. 3 is a structural view showing essential portions of the controller.

In FIG. 2, reference numeral 2 denotes an internal combustion engine disposed in a vehicle (not shown); 4 an air cleaner; 6 a throttle body; 8 a surge tank; 10 an intake manifold; 12 an intake passage; 14 a throttle valve; 16 a fuel injection valve; 18 an exhaust manifold; and, 20 a fuel tank.

The fuel tank 20 is provided with a fuel feed pipe 22, in which an outlet 24 of the pipe 22 at one end thereof is opened inside the fuel tank 20, while a fuel feed opening 26 of the pipe 22 at the other end thereof is opened outside the fuel tank 20. The fuel feed pipe 22 has a fuel feed cap 28 removably positioned thereon at the fuel feed opening 26. The pipe 22 has a fuel feed passage 30 formed therethrough. Fuel in the tank 20 is delivered to the fuel injection valve 16 through a fuel passage by means of a fuel pump (not shown).

The engine 2 has an evaporative fuel controller 32 disposed therein. The fuel controller 32 is provided with evaporation passages one of whose ends are connected to the fuel tank 20. The controller 32 according to the present embodiment is provided with first through fourth evaporation passages 34, 36, 38, and 40.

The first evaporation passage 34 is connected at one end to the fuel tank 20. This end portion of the passage 34 is opened and closed by a first float valve 42. The float valve 42 is moved upward and downward, depending upon the amount of fuel in the tank 20. The other end of the passage 34 is connected to the canister 44.

There is a fuel feed-timed evaporative fuel control valve 46 positioned at a location along the first evaporation passage 34. As illustrated in FIG. 3, the control valve 46 includes the following: a valve opening 48 provided at the end of the first evaporation passage 34; a valve body 50 for opening and closing the valve opening 48; a diaphragm 52 for supporting the valve body 50 so as to allow the valve body 50 to be moved into contact with and away from the valve opening 48; a pressure chamber 54 partitioned by the diaphragm 52; and, a spring 56 for urging the valve body 50 in a direction in which the valve opening 48 is closed.

The pressure chamber 54 communicates with the fuel feed passage 30 adjacent the fuel feed opening 26 through a communication passage 58. The fuel feed-timed control valve 46 opens and closes the first evaporation passage 34 with the aid of: pressure acting on the pressure chamber 54 from the fuel feed passage 30; and, the internal tank pressure of the fuel tank 20.

The second evaporation passage 36 is connected at one end to the fuel tank 20. This end portion of the passage 36 is opened and closed by a second float valve 60. The valve 60 is moved upward and downward, depending upon the quantity of fuel in the tank 20. The other end of the passage 36 is connected to the canister 44. A two-way electromagnetic valve 62 is positioned substantially midway along the second evaporation passage 36.

Figure 3:
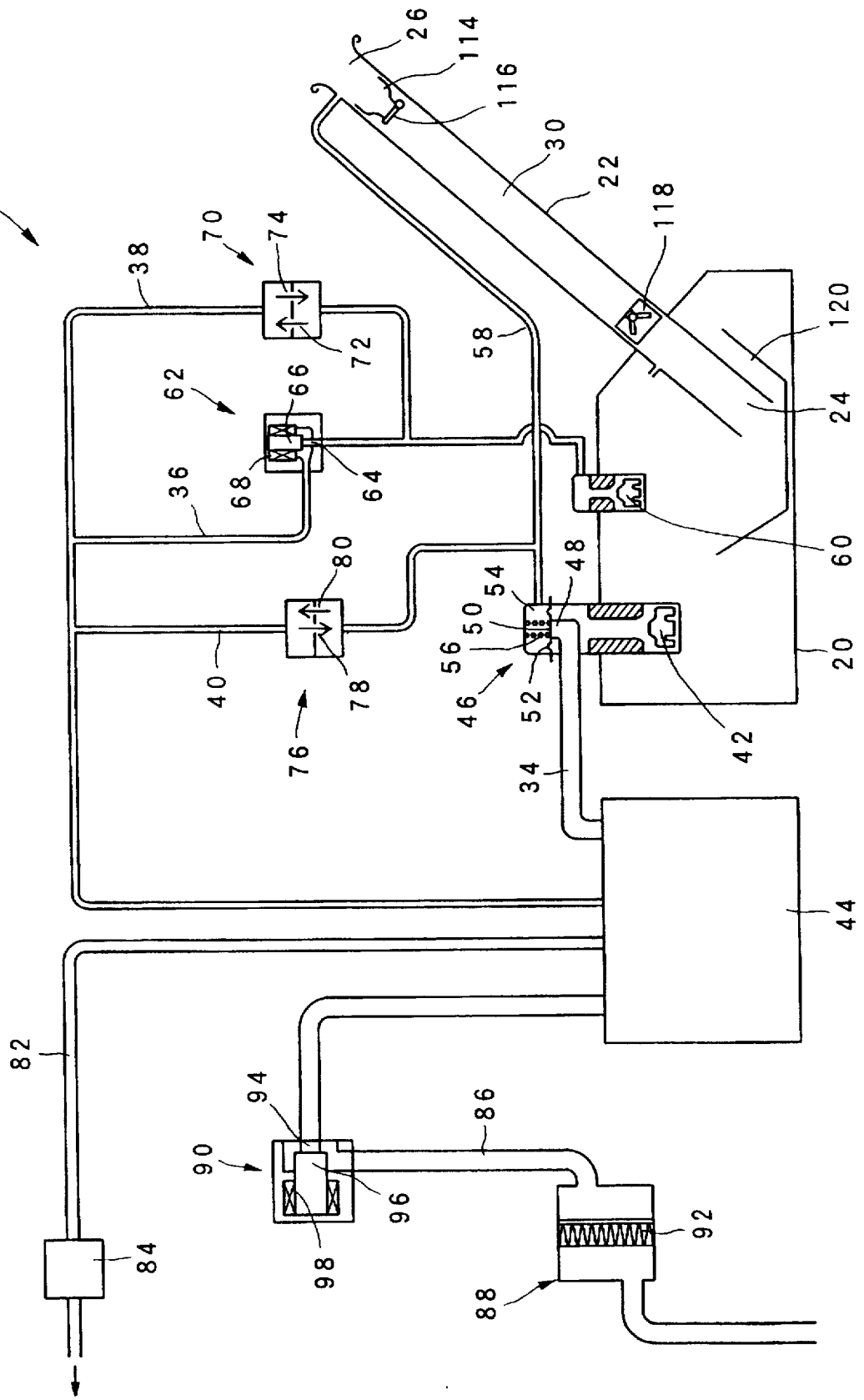

As illustrated in FIG. 3, the electromagnetic valve 62 consists of: a valve opening 64 positioned at an intermediate end of the second evaporation passage 36; a valve body 66 for opening and closing the valve opening 64; and, an electric solenoid 68 for driving the valve body 66 so as to move the valve body 66 into contact with and away from the valve opening 64. The two-way valve 62 is opened and closed by the solenoid 68 being switched on and off in order to bring the second evaporation passage 36 into communication therethrough during operation of the engine 2.

The third evaporation passage 38 bypasses the two-way electromagnetic valve 62, and is connected at one end to the second evaporation passage 36 at a location toward the fuel tank 20, and at the other end to the same passage 36 but at a location toward the canister 44. A pressure control valve 70 is disposed substantially midway along the third evaporation passage 38.

Referring again to FIG. 3, the pressure control valve 70 is provided with throttles 72 and 74 which are oriented in opposite directions. The control valve 70 is operated to bring the third evaporation passage 38 into communication therethrough when the internal pressure of tank 20 reaches a predetermined pressure value after the supply of fuel to the fuel tank 20 during stopping of the engine 2.

The fourth evaporation passage 40 is connected at one end to the communication passage 58. The other end of the passage 40 is connected to the second evaporation passage 36 at a location toward the canister 44, which latter location is spaced toward the canister away from the location where the third and fourth passages 38 and 40 are connected to one another. A pressure-regulating valve 76 is positioned substantially midway along the fourth evaporation passage 40. Referring to FIG. 3, the pressure-regulating valve 76 includes a throttle 78 and a check valve 80 which are oriented in opposite directions relative to one another.

The evaporative fuel controller 32 is provided with a purge passage 82 whose one end is connected to the canister 44. The other end of the purge passage 82 is connected to the intake passage 12 of the surge tank 8 on the downstream side of the throttle valve 14, which is part of an intake system of the engine 2. A purge valve 84 is provided substantially midway along the purge passage 82. The purge valve 84 consists of, e.g., one electromagnetic valve (not shown)

which is opened and closed by the power supply being switched on and off, or another electromagnetic valve (not shown) whose opening degree is adjusted in dependence upon duty. Then, the purge valve 84 regulates the amount of evaporated fuel to be fed into the tank 8, depending upon a running state of the engine 2.

The controller 32 is provided with an ambient air-communication passage 86 whose one end is connected to the canister 44. The other end of the communication passage 86 is open to the ambient air within a vehicular frame and the lair (not shown). The passage 86 has an air cleaner 88 positioned toward the atmospheric end and an ambient air shut-off valve 90 located toward the canister 44.

As illustrated in FIG. 3, the air cleaner 88 houses an air filter 92. As further shown in FIG. 3, the ambient air shut-off valve 90 includes the following: a valve opening 94 provided at an intermediate end of the ambient air communication passage 86; a valve body 96 for opening and closing the valve opening 94; and, an electric solenoid 98 for driving the valve body 96 so as to move the valve body 96 into contact with and away from the valve opening 94. The ambient air shut-off valve 90 opens and closes the ambient air communication passage 86 by the power supply to the solenoid 98 being switched on and off. Then, the ambient air is introduced into the canister 44 during operation of the engine 2, thereby liberating evaporated fuel from the canister 44.

The evaporated fuel is introduced into the canister 44 from the fuel tank 20 through the first to fourth evaporation passages 34, 36, 38, 40, and is then absorbed and retained by the canister 44. The absorbingly maintained fuel is liberated and discharged from the canister 44 by the ambient air introduced through the ambient air introduction passage 86. The liberated and discharged fuel is then supplied to the intake passage 12 of the engine 2.

The fuel injection valve 16, the two-way electromagnetic valve 62, the purge valve 84, and the ambient air shut-off valve 90 are all connected to a control means 100 of the evaporative fuel controller 32. The control means 100 is connected to a level gauge 102 and a pressure sensor 104. The level gauge 102 detects fuel lever (fuel amount) in the tank 20. The pressure sensor 104 detects the internal pressure of the tank 20.

The control means 100 is further connected to the following: an ignition switch 106 for detecting start-up of the engine 2; a throttle sensor 108 for detecting a throttle opening of the throttle valve 14; a vehicle velocity sensor 110 for detecting vehicle velocity; and, a concentration sensor 112 for detecting a concentration of evaporated fuel supplied to the surge tank 8 from the canister 44.

The control means 100 provides the undermentioned regulation on the basis of signals from the level gauge 102, the pressure sensor 104, the ignition switch 106, the throttle sensor 108, the vehicle velocity sensor 110, and the concentration sensor 112. These signals indicate how the engine 2 is operated. Then, the control means 100 controls the fuel injection valve 16 in accordance with such an operating state of the engine 2 during operation of the engine 2, thereby regulating a fuel injection quantity to be supplied to the fuel injection valve 16. Further, the control means 100 controls the purge valve 84 in accordance with the above operating state of the engine 2 during operation of the engine 2, thereby regulating an amount of evaporated fuel to be liberated from the canister 44 and fed into the intake passage 12.

In the evaporative fuel controller 32, the above-mentioned signals are fed into the control means 100. When the control means 100 detects that the engine 2 is in idle operation, and also detects that fuel is being fed into the fuel tank 20, then the control means 100 changes the mode of control over the purge valve 84 from a usual one which meets an operating state of the engine 2 to different one which accommodates the continuance of engine idle operation as well as the continuance of the supply of fuel to the fuel tank 20.

The control means 100 detects that the engine 2 is in idle operation on the basis of an elapsed time after start-up of the engine 2, a vehicle velocity, and the like. Further, the control means 100 detects that fuel is being fed into the fuel tank 20 on the basis of the fuel level or internal pressure of the fuel tank 20, the concentration of evaporated fuel, and the like.

More specifically, the control means 100 detects that the engine 2 is in an idle operation, e.g., when elapsed time "T" after start-up of the engine 2 is equal to or greater than a predetermined time "T2" and further when actual vehicle velocity "V1" is equal to or less than a predetermined vehicle velocity "V2". The control means 100 detects that the fuel tank 20 is supplied with fuel when time-based fuel level variation rate "$\Delta L1$" of fuel level "L" in the fuel tank 20 is equal to or greater than a predetermined fuel level variation value "$\Delta L2$", and further when time duration "T3" for the above-defined time-based fuel level variation rate "$\Delta L1$" with an increase in fuel lever "L" is equal to or greater than a predetermined time "T4".

In addition, the control means 100 detects that the engine 2 is in idle operation when elapsed time "T1" after start-up of the engine 2 is equal to or greater than a predetermined time "T2", and further when actual vehicle velocity "V1" is equal to or less than a predetermined vehicle velocity "V2"; and, the control means 100 detects that fuel is being fed into the fuel tank 20 when time-based tank pressure variation rate "$\Delta P1$" of internal pressure "P" of the fuel tank 20 with an increase in pressure is equal to or greater than a predetermined tank pressure value "$\Delta P2$".

Alternatively, the control means 100 detects that the engine 2 is in an idle operation state when elapsed time "T1" after start-up of the engine 2 is equal to or greater than the predetermined time "T2", and further when actual vehicle velocity "V1" is equal to or less than the predetermined vehicle velocity "V2"; and, the control means 100 detects that fuel is being fed into the fuel tank 20 when time-based variation rate "$\Delta D1$" of concentration "D" of evaporated fuel with an increase in concentration is equal to or greater than a predetermined concentration value "$\Delta D2$" (i.e., a rich air-fuel ratio). The aforesaid evaporated fuel is supplied to the surge tank 8 in the intake system. More specifically, such detection is executed on the basis of a purge concentration-learning value of the evaporated fuel to be supplied to the engine 2, a feedback correction value, and so on.

While the engine 2 is in idle operation and the fuel tank 20 is supplied with fuel, then the control means 100 provides control, e.g., such that the purge valve 84 is powered so as to be closed off; alternatively, the control means 100 executes duty control so as to provide a reduced opening of the purge valve 84.

Referring to FIG. 3, reference numeral 114 is a fuel feed guide provided in the fuel feed passage 30 adjacent the fuel feed opening 26; 116 a fuel feed open/close valve provided on the guide 114; 118 a check valve positioned substantially midway along the fuel feed passage 30; 120 is a fuel receiver for use in closing the outlet 24 of the fuel feed passage 30 with the supplied fuel.

The operation of the present invention will now be briefly described.

Figure 1:
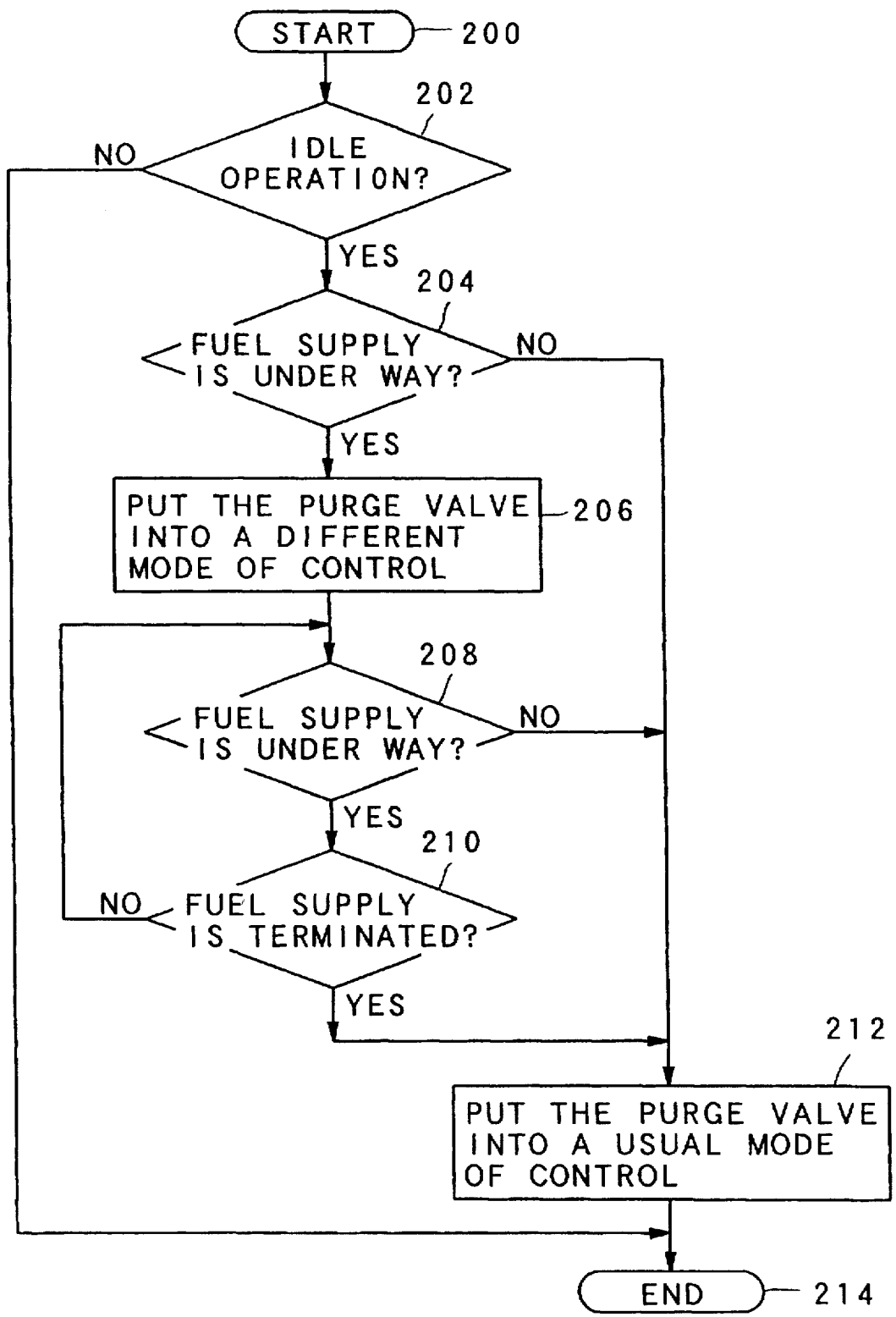
FIG. 1 is a flow chart illustrating how an evaporative fuel controller for an internal combustion engine executes control in accordance with an embodiment of the invention.

As illustrated in FIG. 1, in the evaporative fuel controller 32, when control starts (step 200), then a determination is made as to whether or not the internal combustion engine 2 is in an idle operational state (step 202).

In this step of determination (step 202), the engine 2 is determined to be in idle operation when respective signals from the ignition switch 106 and the vehicle velocity sensor 110 show that elapsed time "T1" after start-up of the engine 2 is equal to or greater than predetermined time "T2", and that vehicle velocity "V1" is equal to or less than predetermined vehicle velocity "V2".

When the determination (step 202) results in "NO", then this routine is terminated (214). When the determination at step 202 is "YES", than a determination is made as to whether or not the fuel tank 20 is in the process of being supplied with fuel (step 204).

In this step of determination (step 204), it is determined that the fuel tank 20 is being supplied with fuel, e.g., when the signal from the level gauge 102 shows that time-based variation rate "ΔL1" of fuel level "L" in the tank 20 is equal to or greater than predetermined value "ΔL2", and when the time duration "T3" for the time-based variation rate "ΔL1" as defined by the above is equal to or greater than predetermined time "T4".

In addition, in the above step of determination (step 204), it is also determined that the fuel tank 20 is now being supplied with fuel when the signal from the pressure sensor 104 shows that time-based variation rate "ΔP1" of internal pressure "P" of the fuel tank 20 is equal to or greater than predetermined value "ΔP2".

Alternatively, in the aforesaid step of determination (step 204), it is determined that tank 20 is being supplied with fuel when the signal from the concentration sensor 112 shows that time-based variation rate "ΔD1" of concentration "D" of evaporated fuel to be fed into the surge tank 8 is equal to or greater than predetermined value "ΔD2".

When the determination at step 204 results in "NO", then the purge valve 84 is controlled in its usual mode to meet a running state of the engine 2 (step 212). Then, this routine is terminated (step 214). When the determination at step 204 results in "YES", then the mode of control of the purge valve 84 is switched from its usual mode to a different mode which permits the continuance of engine idle operation and the continuance of the feeding of fuel into the tank 20 (step 206).

In the aforesaid control suited for the continuance of both idle operation and supply of fuel (step 206), the purge valve 84 is controlled so as to be powered off for shut-off. Alternatively, the duty of the control valve is controlled to be between different duty percentages, e.g. between d1% and d2%, in order to reduce the opening degree of the purge valve 84. As a result, the purge tank 8 is supplied with a reduced quantity of evaporated fuel.

Next, a determination is made at step 208 as to whether or not the fuel tank 20 is being supplied with fuel. The determination (step 208) is made on the same basis as the above determination at step 204.

When the determination at step 208 is "NO", then the mode of control of the purge valve 84 is returned to its usual one which accommodates a running state of the engine 2 (step 212). Then, this routine is terminated (step 214). When the determination at step 208 is "YES", then a determination is made at step 210 as to whether or not the supply of fuel is terminated. This determination at step 210 is made by negation of the same basis as the above determinations at steps 204 and 208.

When the determination at step 210 is "NO", then the routine is returned to the previous determination at step 208.

When the determination at step 210 is "YES", then the mode of control of the purge valve 84 is returned to the aforesaid usual one (step 212), and the routine is then terminated (step 214).

As evidenced by the above, in the evaporative fuel controller 32, when the control means 100 detects that the engine 2 is in idle operation and that the fuel tank 20 is being refueled with fuel, then the control means 100 shifts control over the purge valve 84 from one mode dependent upon an operating state of the engine 2 to another mode which is responsive to the continuance of engine idle operation as well as the continuance of fuel to the tank 20.

Accordingly, in the controller 32, when it detects that the engine 2 is in idle operation and that the fuel tank 20 is being supplied with fuel, then the mode of control over the purge valve 84 is changed from a usual one which accommodates an operating state of the engine 2 to a different one to permit the continuance of engine idle operation as well as the continuance of the supply of fuel to the tank 20. Then, the purge valve 84 is controlled to be shut off, or is alternatively controlled to reduce the degree of opening of the purge valve 84. As a result, the evaporative fuel controller 32 permits only a reduced quantity of evaporated fuel to be fed into the intake passage 12.

Consequently, the controller 32 in the engine 2 can prevent the engine 2 from experiencing aggravated drivability and rough idle operation with a concomitant stall, which would otherwise occur when the fuel tank 20 is supplied with fuel during operation of the engine 2.

In the evaporative fuel controller pursuant to the present invention, when it is detected that the internal combustion engine is in idle operation and that the fuel tank is being supplied with fuel, then a mode of control over the purge valve is changed from a usual one adapted for an operating state of the engine to a different one suited for the continuance of both engine idle operation as well as the supply of fuel to the fuel tank. Then, the purge valve is controlled, so as to be shut off, or is alternatively controlled to provide a reduced opening thereof. As a result, the evaporative fuel controller permits only a reduced quantity of evaporated fuel to be supplied to the intake system, whereby a higher concentration of evaporated fuel is prevented from being supplied in large amounts to the intake system.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In an evaporative fuel controller for an internal combustion engine having an evaporation passage communicated at one end with a fuel tank and at the other with a canister, a purge passage communicated at one end with said canister and at the other end with an intake system of said engine, a purge valve provided along said purge passage, said purge valve being controlled in accordance with a running state of said engine to regulate an amount of evaporated fuel to be fed into said intake system, the improvement comprising: a control means which, when it detects that said engine is in idle operation and that said fuel tank is being supplied with fuel, then it changes a mode of control over said purge valve from one which meets an operating state of said engine to another which permits continuance of engine idle operation as well as continuance of fuel supply to said tank.

2. An evaporative fuel controller as defined in claim 1, wherein said control means detects that said engine is in idle operation when an elapsed time after start-up of said engine is equal to or greater than a predetermined time, and further when vehicle velocity is equal to or less than a predetermined vehicle velocity, and wherein said control means detects that said fuel tank is being supplied with fuel when a time-based variation rate of fuel level in said fuel tank is equal to or greater than a predetermined value, and further when duration for the time-based variation rate is equal to or greater than a predetermined time.

3. An evaporative fuel controller as defined in claim 1, wherein said control means detects that said engine is in idle operation when an elapsed time after start-up of said engine is equal to or greater than a predetermined time, and further when vehicle velocity is equal to or less than a predetermined vehicle velocity, and wherein said control means detects that said fuel tank is being supplied with fuel when a time-based variation rate of internal pressure of said fuel tank is equal to or greater than a predetermined value.

4. An evaporative fuel controller as defined in claim 1, wherein said control means detects that said engine is in idle operation when an elapsed time after start-up of said engine is equal to or greater than a predetermined time, and further when vehicle velocity is equal to or less than a predetermined vehicle velocity, and wherein said control means detects that said fuel tank is being supplied with fuel when a time-based variation rate of a concentration of evaporated fuel to be fed into said intake system is equal to or greater than a predetermined value.

* * * * *